March 9, 1943. P. BARY 2,313,190
PROCESS FOR THE PREPARATION AND USE OF ANTI-CRYPTOGAMIC
COLLOIDAL SOLUTIONS, BACTERICIDES, AND INSECTICIDES
Filed June 18, 1938

INVENTOR.
PAUL BARY.

BY           ATTORNEY.

Patented Mar. 9, 1943

2,313,190

UNITED STATES PATENT OFFICE 2,313,190

PROCESS FOR THE PREPARATION AND USE OF ANTI-CRYPTOGAMIC COLLOIDAL SOLUTIONS, BACTERICIDES, AND INSECTICIDES

Paul Bary, Paris, France; vested in the Alien Property Custodian

Application June 18, 1938, Serial No. 214,496
In Luxemburg December 17, 1937

3 Claims. (Cl. 167—16)

The invention relates to a process for the preparation and use of anti-cryptogamic colloidal solutions, bactericides and insecticides.

It is known that the use of colloidal suspensions applied to plants for agricultural and for breeding purposes are extremely efficient and economical, but only when the liquids are in a state of dilution, which ensures the greatest state of granular fineness, and when the suspensions are freshly prepared otherwise, the flocculation and sedimentation take place which are caused by the agglomeration of the granules) resulting in the reduction of their active surface) in relation to the time in which they are formed.

It is likewise known that a large number of colloidal solutions, very diverse from the chemical point of view, can be obtained by simple mixture of two real solutions, the dispersed colloidal body resulting from the chemical action produced at the moment of their mixture.

Figure 1:
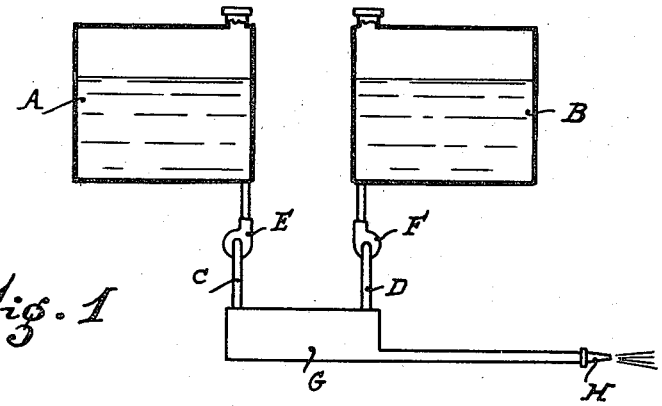
Figure 2:
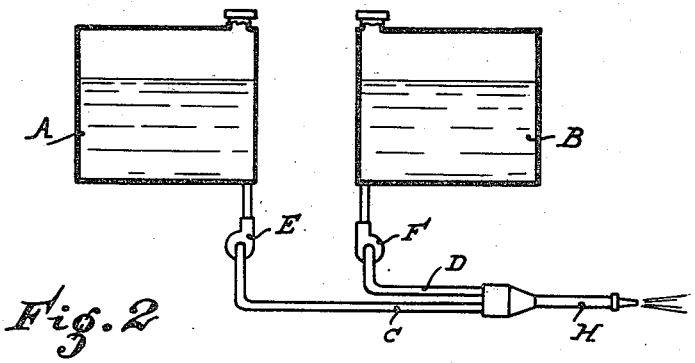
Figure 3:
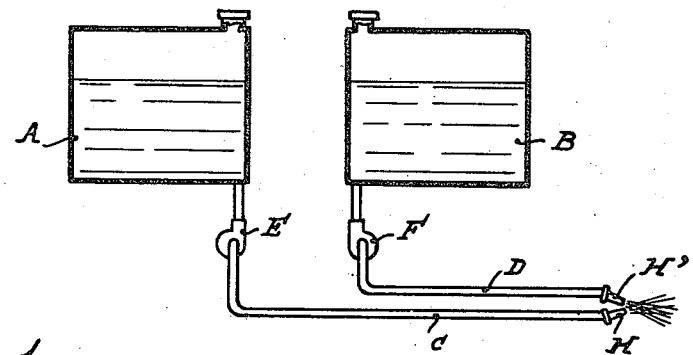

The present invention has for an object a process for the preparation and the simultaneous use of the colloidal suspensions for agricultural and like purposes. This process is based on the two general observations above mentioned and consists in the preparation of two solutions of bodies or mixture of bodies soluble in ordinary water at a suitable concentration, each of them being placed in a different vessel or container. The pulverization is then effected by projecting or sending into the spraying tube or tubes, equal or proportionate parts of two, or more, liquids mixing with each other at the moment only of their projection:

Either into an intermediate bottle or the like, situated behind the spraying tube;

Or into pipes conducting to the spraying tube or tubes;

Or by crossing the jets of the two, or more, spraying tubes. The annexed drawing shows the possible realization of the prepaartion of two solutions according to three different installations diagrammatically indicated, viz:

Fig. 1 illustrating an assembly for a mixture of two solutions in an intermediate container situated before the spraying tube;

Fig. 2 illustrating an assembly for a mixture of two solutions in the spraying tube itself; and Fig. 3 illustrating an assembly for a mixture of two solutions by crossing the jets of two spraying tubes.

According to Figure 1, each solution is placed in a distinct reservoir A and B, respectively, and is there held under pressure (by an appropriate device E or F). From this container the solutions are led by pipes C and D, respectively, to a mixing bottle G or the like situated immediately before the spraying tube H.

As the invention consists in the use of two liquids or solutions of compositions adapted to react upon each other at the moment which may precede immediately prior to the projection of said liquids, it is obvious that other means may also be used to obtain this result contemplated by this invention.

As regards the liquids which are to be used in obtaining a colloidal solution, they will vary with the nature of the application to be made.

By way of examples, there may be mentioned the use of cupric bottles employed in viticulture and for many plants and trees.

I. For this use the following two solutions are suggested:

(1) Copper sulphates: 200 grams; water: quantity necessary for 50 litres;

(2) Sodium carbonates: 225 grams; water: quantity necessary for 50 litres.

Wetting and adhesive agents are added thereto.

Upon the mixture of these two solutions, there will be a rapid formation of hydrate of the cupric oxide dispersed in a large volume of water and which will be deposited only after projection thereof on the leaves and fruits to be treated, by the evaporation of the water.

As it is customary to employ not only wetting agents but also adhesive agents, the above formula contains the two additions, but the adhesive is rendered unnecessary in the majority of cases owing to the fact that in this method of using the colloidal solutions, the dispersion is in granules which are so fine that the cupric hydrate forms an insoluble teint on the leaves and that the adherence to these latter is naturally very high.

II. For sulphur treatment it is possible, for intsance, to use the following solutions:

(1) Mixture of protosulphide of sodium ($SNa_2$): 320 grams and of sulphite of sodium ($SO_3Na_2$) 270 grams; water: quantity sufficient for 50 litres;

(2) Hydrochloric acid: 400 grams; water in a quantity necessary for 50 litres;

Wetting and adhesive agents are added.

The same remarks made for the preceding case are applicable to this case.

III. Arsenate of lead can be obtained in the same manner by means of the two following solutions:

(1) Arsenate of ammonium;

(2) Acetate of lead; in appropriate molecular proportions, the conditions being as above described with respect to the other solutions.

Under similar conditions it is possible to obtain suspensions of hydrate of ferric oxide or of any other insoluble metallic oxides, or suspensions of all insoluble salts which can be prepared by mixture of diluted solutions of elements soluble in water such as copper sulphide or sulphide of nicotine or any others.

Each parasite to be fought necessitates particular metals which have the maximum effect thereon so that it is necessary to vary the preparation to be used according to the different cryptogames or insects to be destroyed and to make mixtures of several products according to circumstances.

Although, in general, two solutions for mixing are sufficient to obtain complex mixtures, the invention does not exclude, if necessary, the use of more than two partial reservoirs, the liquids from which can simultaneously add together, or first by pairs and subsequently adding together the pairs, or in any other manner. In this way it is possible to make, for example, mixtures of sulphur and copper oxide for fighting, at one operation of spraying, against oidium and mildew, if necessary.

Finally, the reaction of the solutions which has to occur fairly rapidly in order to obtain the deposit on the leaves in a fairly short space of time, the latter may be adjusted by the addition (in proportions suitable for each case) and in ratio with the pureness of the water employed, of neutral salts added to the solutions, such as sodium chlorate or calcium chlorate or others, in such a manner as to obtain the flocculation and the sedimentation in the most satisfactory time.

What I claim is:

1. A process for the preparation of colloidal solutions employable for agricultural purposes which consists in feeding two solutions of compositions providing a colloidal suspension upon mutual reaction thereof to separate spraying nozzles, and bringing together said solutions at the free ends of the separate nozzles.

2. A process according to claim 1 wherein said solutions substantially contain copper sulphate and sodium carbonate, respectively.

3. A process according to claim 1 wherein each of said solutions contain neutral salts for obtaining a more rapid flocculation.

PAUL BARY.